United States Patent [19]
Okuya et al.

[11] Patent Number: 5,454,135
[45] Date of Patent: Oct. 3, 1995

[54] WINDSHIELD WIPER SUPERSTRUCTURE WITH AIRFOIL

[75] Inventors: Satoru Okuya, Nagoya; Eiichi Ohmura, Okazaki; Yaoki Hiraku, Toyohashi, all of Japan

[73] Assignees: Toyota Jidosha Kabushiki Kaisha, Toyota; Asmo Co., Ltd., Kosai, both of Japan

[21] Appl. No.: 42,713

[22] Filed: Apr. 5, 1993

[30] Foreign Application Priority Data

Apr. 9, 1992 [JP] Japan ................. 4-089067

[51] Int. Cl.⁶ ................. B60S 1/38; B60S 1/40
[52] U.S. Cl. ................. 15/250.42; 15/250.31; 15/250.20
[58] Field of Search ................. 15/250.42, 250.41, 15/250.40, 250.36, 250.20, 250.35, 250.32, 250.31

[56] References Cited

U.S. PATENT DOCUMENTS

| 4,741,071 | 5/1988 | Bauer et al. ................. 15/250.42 |
| 5,179,761 | 1/1993 | Buechele et al. ................. 15/250.42 |
| 5,311,636 | 5/1994 | Lee ................. 15/250.42 |
| 5,319,826 | 6/1994 | Mower ................. 15/250.42 |
| 5,686,534 | 2/1992 | Journee ................. 15/250.42 |

FOREIGN PATENT DOCUMENTS

| 0343869 | 11/1989 | European Pat. Off. . |
| 2671528 | 7/1992 | France . |
| 4010467 | 10/1991 | Germany . |
| 4116968 | 11/1992 | Germany ................. 15/250.42 |
| 54-12689 | 5/1979 | Japan . |
| 62-61862 | 3/1987 | Japan . |
| 2030447 | 4/1980 | United Kingdom . |
| 2190834 | 12/1987 | United Kingdom . |
| 2191936 | 12/1987 | United Kingdom ................. 15/250.35 |
| 8400523 | 2/1984 | WIPO . |

Primary Examiner—Gary K. Graham
Attorney, Agent, or Firm—Cushman, Darby & Cushman

[57] ABSTRACT

A vehicle wiper for use with a vehicle windshield includes a first lever having opposing end portions, a plurality of second levers supporting a rubber wiper blade, the first lever having the second levers pivotably connected to the end portions of the first lever while being pivotably held to a wiper arm at an intermediate portion of the first lever. The first lever includes a first mounting portion having spaced, opposing sides and a pair of walls defined at the opposing sides so as to permit the first lever to be mounted to the wiper arm and a pair of second mounting portions, each having a pair of walls spaced apart from each other. A fin portion is defined between the first mounting portion and the second mounting portion and extends from the first and second mounting portions. The fin portion has a rear edge portion formed at a top portion thereof, thereby preventing the wiper blade from being lifted from the windshield so as to wipe against the windshield when the vehicle travels at high speed. Twisted portions integrally combine the fin portion with the first mounting portion as well as the second mounting portion, in such a manner that the fin portion is joined smoothly and continuously and is integral with a front wall of the first mounting portion and a front wall of the second mounting portion.

6 Claims, 12 Drawing Sheets

FIG. 10A   FIG. 10B   FIG. 10C   FIG. 10D
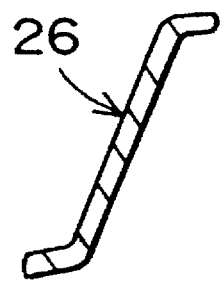 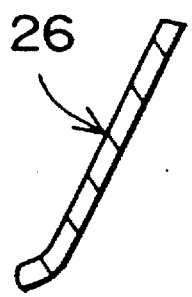 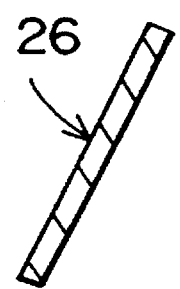 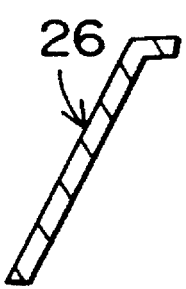
FIG. 10E   FIG. 10F   FIG. 10G
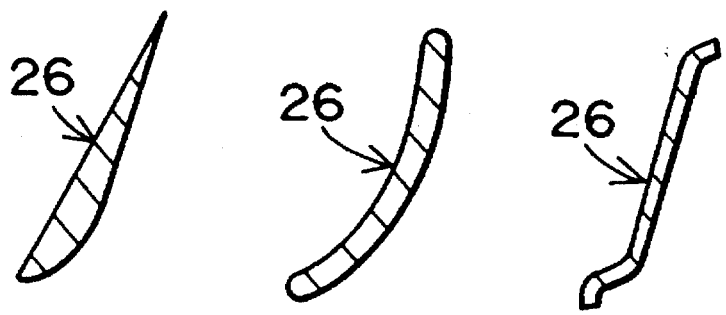
FIG. 11A   FIG. 11B
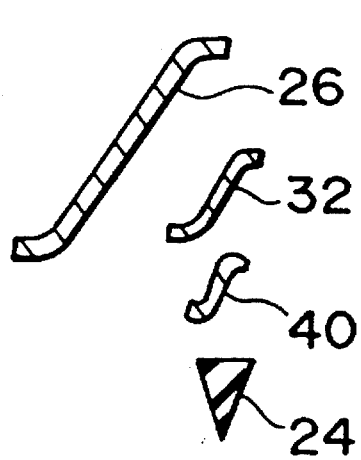 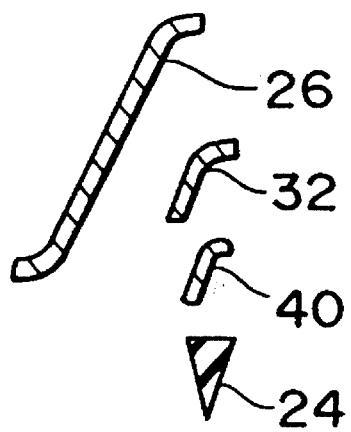

WINDSHIELD WIPER SUPERSTRUCTURE WITH AIRFOIL

BACKGROUND OF THE INVENTION

1. Field of the Invention

The present invention relates to a vehicle wiper for squeegeeing a windshield and the like of an automobile.

2. Description of the Related Art

In vehicle wipers for squeegeeing a windshield and the like of automobiles, there is a so-called tournament type wiper (i.e., a wiper having a hierarchical tree structure) now in general use. This type of wiper has the wiping-ability of even wiping a curvilinear windshield. The curvilinear windshield is thereby wiped completely.

The above tournament type wiper has a wiper blade which includes one rubber blade and a plurality of levers. The levers further include one first lever and a plurality of second levers. The second levers are held to the first lever which in turn is pivotably held to an arm piece of a wiper arm. Furthermore, the rubber blade is held to yoke levers which in turn are held to the second levers. The levers are thus connected successively to each other in a direction normal to the plane of the windshield, i.e., in a height direction of the rubber blade. In addition, the levers are coupled together so as to pivot freely on each joint portion of the levers.

Since a single wiper blade is provided with a plurality of joint portions in this way, the levers are permitted to swing about their connections (i.e. the joint portions) even for a curvilinear windshield, so as to accommodate a curved surface of the windshield. The wiper blade, more precisely, the rubber blade is thereby allowed to firmly squeegee against the surface of the windshield. As a consequence, the windshield can be wiped completely without detracting from the wiping-ability of the rubber blade.

Such a conventional tournament type wiper has the levers connected together in series in the height direction of the rubber blade, as previously described. Accordingly, the tournament type wiper can even cope with a windshield having a high curvature, with the levers being provided with a larger number of the connections (i.e., the joint portions), when desired. However, an increase in the number of the connections of the levers increases a projected area over a front surface of the wiper blade in a moving direction of a vehicle. Thus, air resistance (i.e., drag) and lift increase with the increase of speed of the vehicle.

An increase in drag is undesirable. Consequently, it is necessary to increase the strength of the wiper and use a larger-sized wiper motor. In addition, an increase in lift leads to the lifting-off of the wiper blade, or rather the rubber blade. This precludes the rubber blade from wiping against the surface of the windshield in firm contact therewith. As a consequence, the rubber blade acquires an inferior wiping-ability.

FIG. 13 illustrates a wiper blade 74 in which a first lever 70 is provided with a fin portion 72 in order to prevent the lifting-off of the wiper blade 74 due to the speed of a vehicle. This vehicle wiper is disclosed in Japanese Patent Application Laid-Open No. 62-61862.

With continued reference to the wiper blade 74, FIG. 14 illustrates a cross-sectional view of a mounting portion 70A. The first lever 70 is formed with the mounting portion 70A to permit the first lever 70 to be mounted to a wiper arm. The mounting portion 70A includes a rear wall 70B in order to increase the rigidity of the mounting portion 70A. The mounting portion 70A thereby assumes a substantially rectangular-shaped cross-section.

Accordingly, the rear wall 70B interferes with a flow of air which passes beneath the fin portion 72 in the direction of arrow W of FIG. 14. This interference adversely affects aerodynamic characteristics.

Further, in United Kingdom Patent Application Laid-Open No. GB 2190834 A, the fin is disclosed, which is provided at the wiper blade in order to prevent the lifting-off of the wiper blade when the vehicle travels at high speeds. However, the torsional rigidity and the flexural rigidity of this wiper blade are insufficient.

SUMMARY OF THE INVENTION

In view of the above-described fact, an object of the present invention is to provide a vehicle wiper which can attain improved aerodynamic characteristics such that a wiper blade is allowed to wipe against a windshield when a vehicle travels at high speed.

According to the present invention, the vehicle wiper is provided with a plurality of second levers and one first lever, the second levers supporting a rubber blade either with or without the use of a yoke lever, the first lever having the second levers pivotably connected to both end portions of the first lever while being pivotably held to a wiper arm at an intermediate portion of the first lever, the first lever includes: a first mounting portion having a pair of side walls defined at both sides of the first mounting portion which are spaced apart from each other in the longitudinal direction of the vehicle so as to permit the first lever to be mounted to the wiper arm; second mounting portions, each including a pair of side walls spaced apart from each other in the longitudinal direction of the vehicle, thereby assuming a substantially rectangular-shaped cross-section such that the second levers are mounted to the second mounting portions; a pair of fin portion member, defined respectively between the first mounting portion and each of the second mounting portions and extending from the first lever in a lower-forward direction of the vehicle so as to project beyond certain walls of the pairs of side walls of the first and second mounting portions, the certain walls being located in the forward direction of the vehicle; and, a twisted portion, combining the fin portion integrally with the first mounting portion as well as the second mounting portions. The fin portions have a rear edge portion formed at the top portion of each fin portion in relation to a vertical axis of the vehicle. As a result, when the vehicle travels at high speed, the wiper blade wipes the windshield without being lifted from the windshield.

According to the present invention having the above structure, the first lever comprises the fin portions which have the rear edge portions formed at the top portions of the fin portions with respect to the vertical direction of the vehicle. This arrangement eliminates a rear wall which has been provided behind the fin portions in conventional wiper blade structures; the rear wall would impede an airflow which streams along the fin portions. The absence of the rear wall provides improved aerodynamic characteristics, which allows the wiper blade to squeegee against the windshield while the vehicle runs at high speed. In addition, the first lever comprises the twisted portion which combines the fin portions integrally with the first mounting member as well as the second mounting portions. The first lever thereby acquires sufficient rigidity. The fin portions, the first mounting portion, and the second mounting portions form the first lever. The first mounting portion has the pair of side walls defined at both sides thereof which are spaced apart from each other in the longitudinal direction of the vehicle so as to permit the first mounting portion to be mounted to the wiper arm. The second mounting portions have a substantially rectangular-shaped cross-section such that the second levers are mounted to the second mounting portions.

In a vehicle wiper in accordance with another aspect of the present invention, the first lever is provided with the fin portions such that the rear edge portion of each fin portion is offset either in the forward direction or the rearward direction of the vehicle with respect to the center line which extends centrally through transverse axes of longitudinally extending intermediate portions of the first and second levers.

According to the present invention having the above-described structure, the first lever is provided with the fin portions so that the rear edge portions of the fin portions are offset either in the forward direction or the rearward direction of the vehicle with respect to the center line that extends centrally through the transverse axes of the longitudinally extending intermediate portions of the first and second levers. This positioning of the rear edge portion provides a wide air-emitting passage between the first mounting portion and each of the second mounting portions, as seen from the top of the wiper blade, so as to emit air between the first lever and the second levers. Airflow thereby passes conveniently through the air-emitting passages defined therebetween, which provides improved aerodynamic characteristics. As a result, when the vehicle travels at high speed, the wiper blade wipes the windshield without being lifted from the windshield.

In a vehicle wiper according to a further aspect of the present invention, the first mounting portion comprises a connecting fin portion. The connecting fin portion extends in the forward direction of the vehicle continuously from a bottom edge portion of one wall of the pair of side walls of the first mounting portion, the one of the pair of side walls being located in the forward direction of the vehicle. The connecting fin portion further extends therefrom in the lower-forward direction of the vehicle.

According to the present invention having the above structure, the connecting fin portion extends in the forward direction of the vehicle continuously from the bottom edge portion of one wall of the pair of side walls of the first mounting portion, the one wall of the pair of side walls being located in the forward direction of the vehicle. The connecting fin portion further extends therefrom in the lower-forward direction of the vehicle. Air current flows along beneath the connecting fin portion of the first mounting member in relation to the vertical axis of the vehicle. Now, the connecting fin portion guides the air current into a path which extends through the underside of the rear wall of the first mounting portion. This reduces the occurrence of disturbed airflow caused by the rear wall of the first mounting portion. Such a smooth flow of air provides improved aerodynamic characteristics. As a consequence, when the vehicle runs at high speed, the wiper blade squeegees the windshield without being lifted from the windshield.

BRIEF DESCRIPTION OF THE DRAWINGS

FIGS. 10A through 10G are cross-sectional views, illustrating first levers of vehicle wipers in accordance with still further variations of the first embodiment;

FIGS. 11A and 11B are cross-sectional views, showing wiper blades of vehicle wipers according to even further variations of the first embodiment;

DESCRIPTION OF THE PREFERRED EMBODIMENTS

A vehicle wiper according to a first embodiment of the present invention will now be described with reference to FIG. 1 through FIG. 4.

Figure 1:
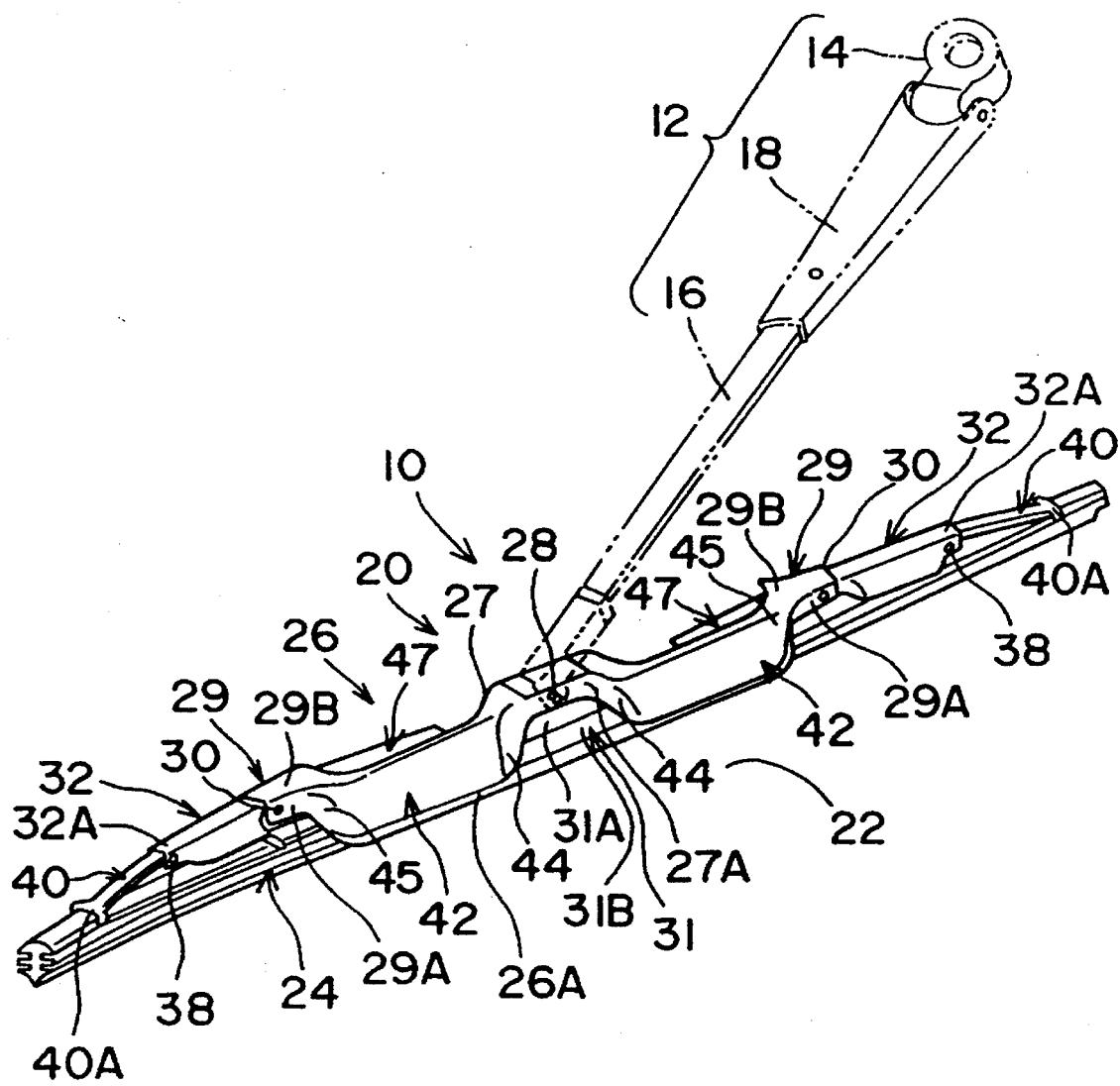
FIG. 1 is a perspective view, illustrating a vehicle wiper in accordance with a first embodiment of the present invention. A part of the vehicle wiper is shown in phantom.

FIG. 1 illustrates a vehicle wiper 10 which includes a wiper arm 12 and a wiper blade 20. The wiper arm 12 further includes an arm head 14, an arm piece 16, and a retainer 18. The arm head 14 is fixed to an unillustrated pivot shaft which in turn is mounted to a vehicle body. The arm piece 16 is connected to the arm head 14 so as to hold the wiper blade 20. (Details on the wiper blade 20 can be found in the next paragraph hereinbelow.) The retainer 18 connects the arm head 14 and the arm piece 16 together. In addition, there is an unillustrated arm spring disposed between the arm head 14 and the arm piece 16. The arm spring imparts a given compressive force to the wiper blade 20 so as to force the wiper blade 20 against a windshield 22.

Next, the wiper blade 20 consists of a rubber blade 24 and a plurality of metallic levers for having the rubber blade 24 held to the metallic levers. The windshield 22 is squeegeed by the rubber blade 24 being held in contact with the surface of the windshield 22.

A first lever 28 is formed by part of the above metallic levers which have the rubber blade 24 held to the metallic levers. The first lever 26 has a first mounting portion 27 defined at a longitudinally extending intermediate portion of the first lever 26. The first mounting portion 27 is pivotably supported to one end portion of the arm piece 16 by a rivet 28.

Figure 3:
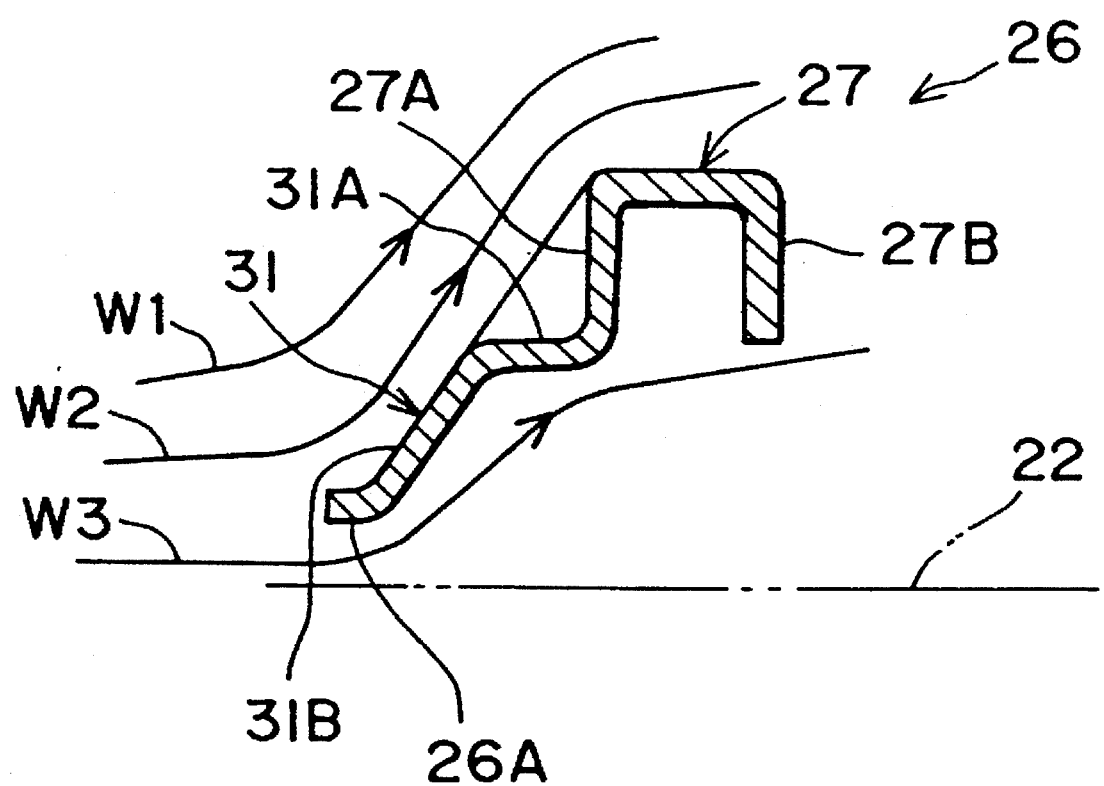
FIG. 3 is a cross-sectional view taken along line 3—3 of FIG. 2.

FIG. 3 illustrates a cross-sectional view of the first mounting portion 27 of the first lever 26. The first mounting portion 27 includes a front wall 27A and a rear wall 27B, with an opening portion of the first mounting portion 27 facing the windshield 22 (i.e., in the downward direction of FIG. 3). Accordingly, the first mounting portion 27 has a substantially rectangular-shaped cross-section. The front wall 27A is provided with a connecting fin portion 31 at a bottom edge portion of the front wall 27A. The connecting fin portion 31 includes a horizontal portion 31A and a beveled portion 31B. The horizontal portion 31A extends in the forward direction of a vehicle continuously from the bottom edge portion of the front wall 27A. The beveled portion 31B extends in a lower-forward direction of the vehicle continuously from the horizontal portion 31A.

As designated by arrows W1, W2, and W3 of FIG. 3, there are currents of air which separately flow along the connecting fin portion 31 of the first mounting portion 27. In particular, the air current W3, which flows along the underside of the connecting fin portion 31, is guided by the horizontal portion 31A into a path which extends through the underside of the rear wall 27B of the first mounting portion 27.

Referring back to FIG. 1, the first lever 26 is formed with a pair of second mounting portions 29 at both end portions thereof in the longitudinal direction of the first lever 26. Each of the pair of second mounting portions 29 has a substantially rectangular-shaped cross-section, with an opening portion thereof being directed toward the windshield 22. The pair of second mounting portions 29 has a pair of second levers 32 pivotably supported thereto by rivets 30.

Figure 4:
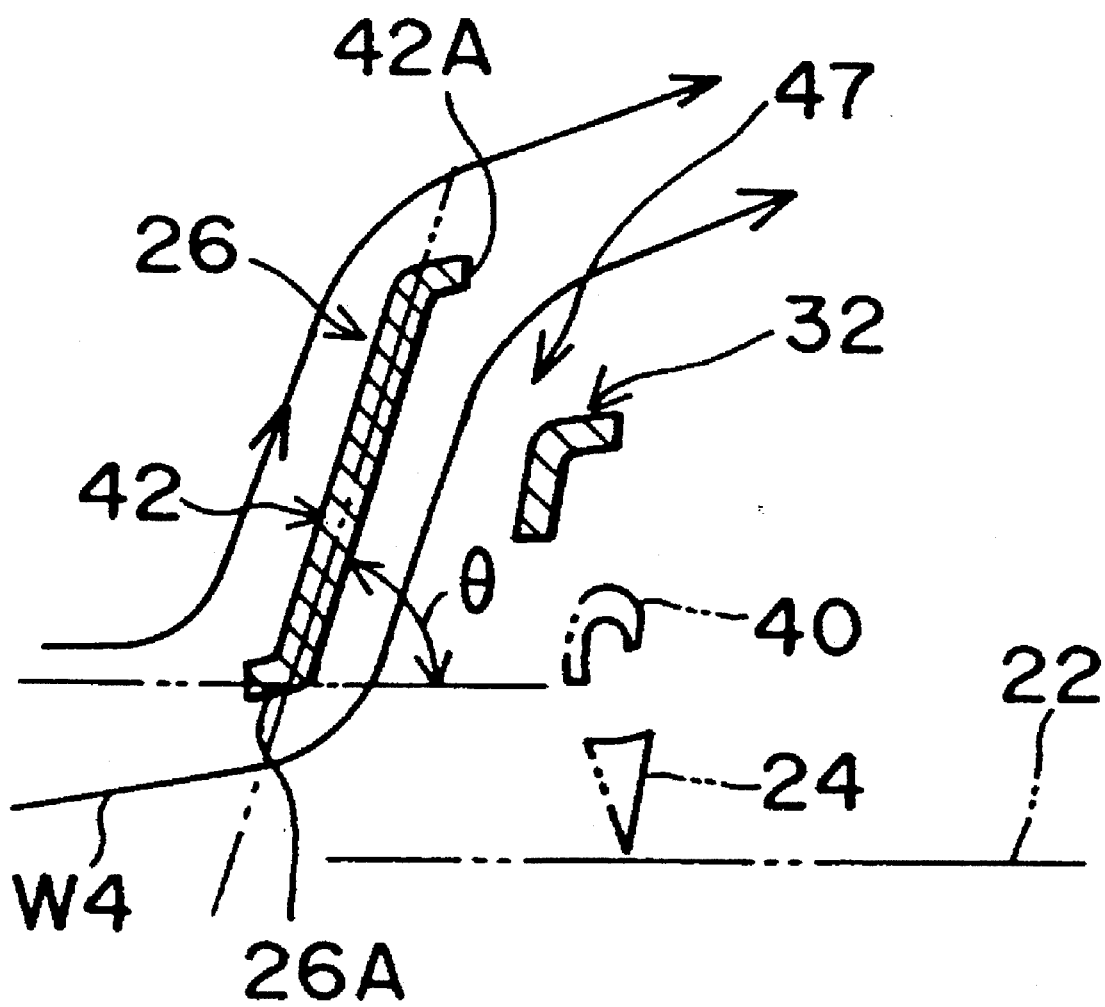
FIG. 4 is a cross-sectional view taken along line 4—4 of FIG. 2.

The first lever 26 further has a pair of fin portions 42 defined between the first mounting portion 27 and the pair of second mounting portions 29. The pair of fin portions 42 extends downwardly therefrom so as to project forwardly beyond the front wall 27A of the first mounting portion 27 as well as a pair of front walls 29A of the pair of second mounting portions 29. The pair of fin portions 42 are combined integrally with: the first mounting portion 27 via a pair of twisted portions 44; and, the pair of second mounting portions 29 via a pair of twisted portions 45. FIG. 4 shows a cross-sectional view of each of the pair of fin portions 42 of the first lever 26, in which the fin portion 42 slants upwardly at an angle ranging from zero to 90° with respect to the horizontal plane of the fin portion 42.

Figure 2:
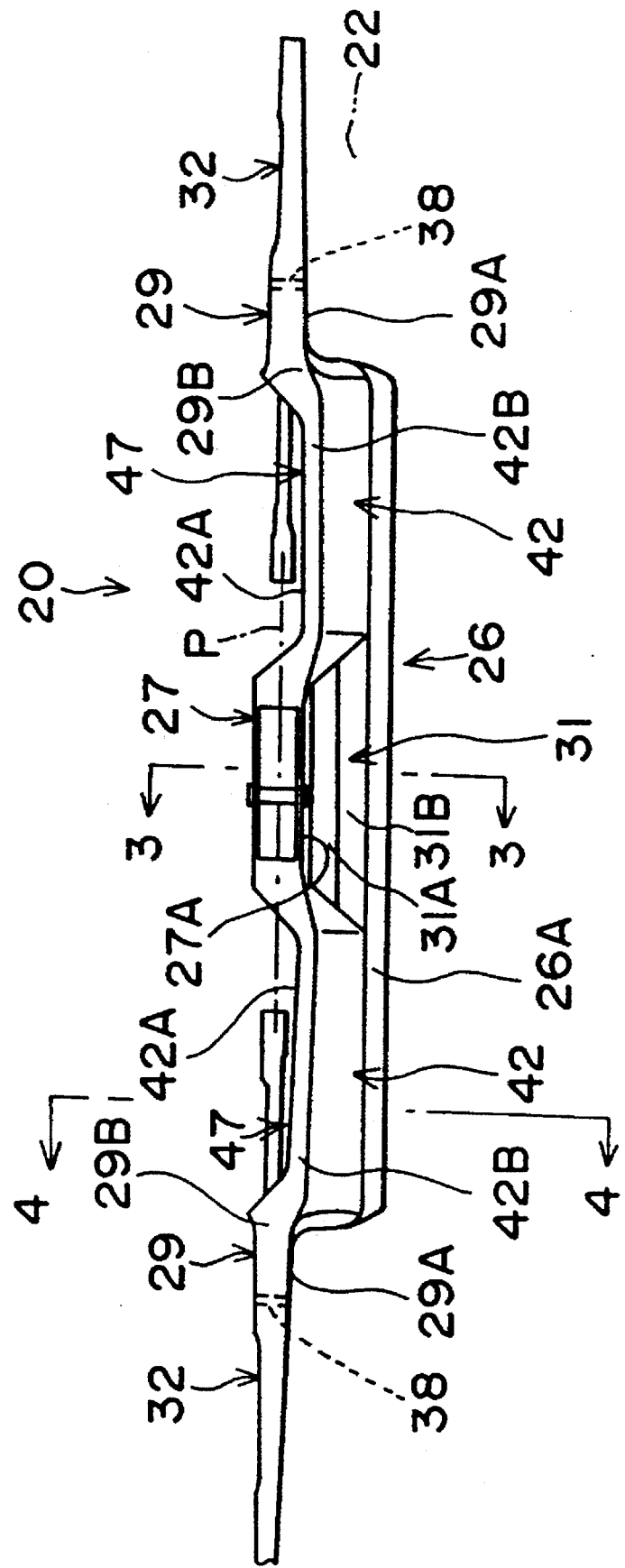
FIG. 2 is a plan view, illustrating main components of the vehicle wiper in accordance with the first embodiment. A part of the vehicle wiper is shown in phantom.

Referring to FIG. 2, each of the pair of fin portions 42 includes a rear edge portion 42A and an upper surface portion 42B. Each of the pair of second mounting portions 29 has an upper surface portion 29B which is integrally combined with the upper surface portion 42B of the fin portion 42. Accordingly, the rear edge portion 42A extends from the upper surface portion 29B along the upper surface portion 42B. In addition, according to the present embodiment, a pair of rear edge portions 42A of the fin portions 42 is forwardly offset from the longidutinal axis or center line P (i.e., in the downward direction of FIG. 2), center line P extending centrally through the first lever 26 and the pair of second levers 32.

A wide air-emitting passage 47 is thereby provided between the first mounting portion 27 and the pair of second mounting portions 29, as seen from the top of the wiper blade 20. As illustrated in FIG. 4, air is permitted to emit though the passage 47 which is defined between the first lever 26 and the second lever 32.

Referring back to FIGS. 1 and 2, the first lever 26 includes a leading edge portion 26A in the longitudinal direction of the first lever 26. The leading edge portion 26A extends continuously between the pair of fin portions 42 and the connecting fin portion 31. With further reference to FIGS. 3 and 4, the leading edge portion 26A is bent in the forward direction of the vehicle in order to prevent burble from occurring when airflow strikes thereagainst.

As shown in FIG. 1, the first lever 26 has the pair of second levers 32 connected thereto at both end portions of the first lever 26. The pair of second levers 32 is formed with a pair of connecting portions 32A at opposite end portions thereof in the longitudinal direction of the pair of second levers 32. Each of the pair of connecting portions 32A has an opening portion facing the windshield 22, thereby forming a substantially rectangular-shaped cross-section. The pair of connecting portions 32A is provided with a pair of yoke levers 40 which is pivotably supported thereto via each rivet 38. The pair of yoke levers 40 is formed with a pair of holding portions 40A at opposite end portions thereof in the longitudinal direction of the pair of yoke levers 40. Each of the pair of yoke levers 40 has an opening portion directed toward the windshield 22, thereby assuming a substantially u-shaped cross-section. In this way, the wiper blade 20 is formed into a so-called tournament type rubber blade holder by the first lever 26, the pair of second levers 32, and the pair of yoke levers 40.

Next, the operation of the present embodiment will be described.

Figure 12:
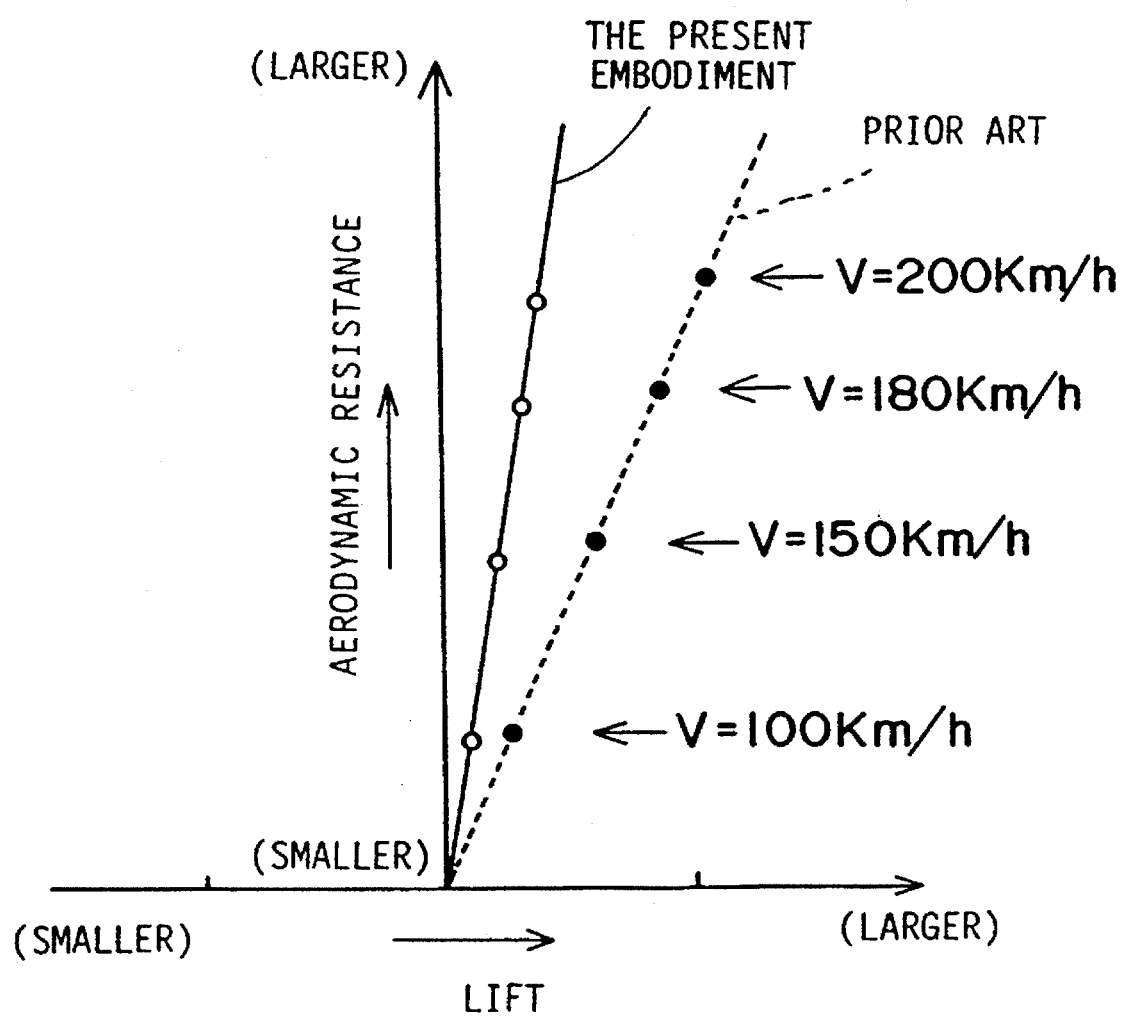
FIG. 12 is a graphical illustration, indicating lift and aerodynamic characteristics of a wiper blade according to the first embodiment and those of a conventional wiper blade.
Figure 13:
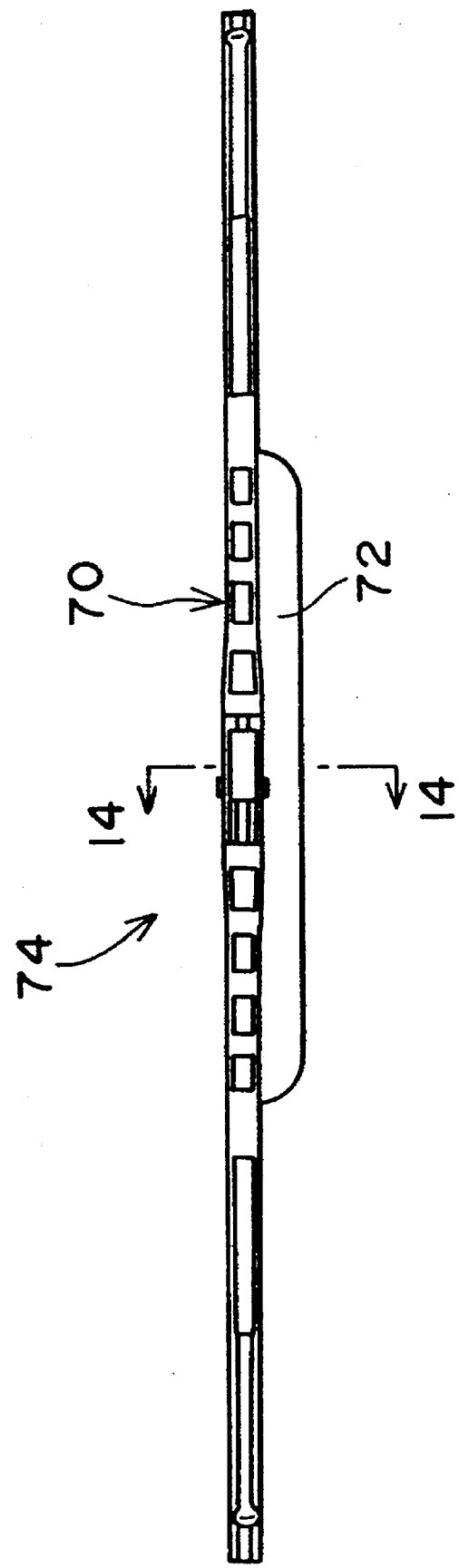
FIG. 13 is a plan view, illustrating a wiper blade of a conventional vehicle wiper; and, FIG. 14 is a cross-sectional view taken along line 14—14 of FIG. 13.
Figure 14:
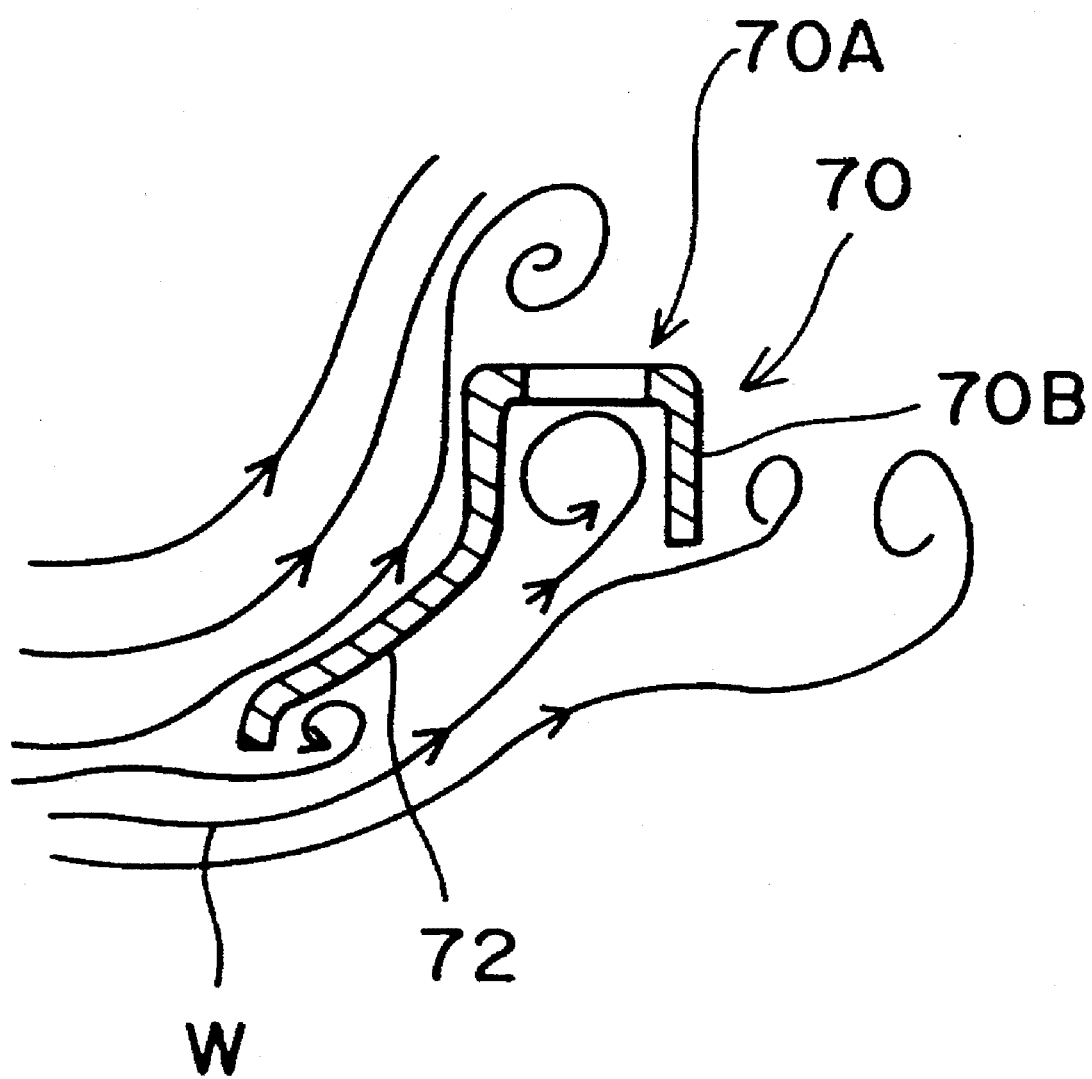

In the vehicle wiper 10 according to the present embodiment, the first lever 26 includes a pair of fin portions 42. Each of the pair of fin portions 42 has a rear edge portion 42A and an upper surface portion 42B. Each of the pair of second mounting portions 29 has an upper surface portion 29B. The upper surface portion 42B extends continuously from the upper surface portion 29B. Accordingly, the rear edge portion 42A extends from the upper surface portion 29B along the upper surface portion 42B. This configuration eliminates a rear wall 70B which is provided behind a fin portion 72 in conventional wiper blade structures, as illustrated in FIG. 14. The rear wall 70B interferes with air current W flowing along the fin portion 72. The absence of the rear wall 70B provides improved aerodynamic characteristics, as can be seen from FIG. 12. According to the drawing, lift and aerodynamic force achieved by the present embodiment (see the solid line of FIG. 12) is smaller than in a prior art example as indicated by the dotted line of FIG. 12, assuming that car velocity V is the same in both cases. Such improved aerodynamic characteristics permits the use of a smaller-sized wiper motor and allows the wiper blade 20 to squeegee the windshield 22 in firm contact therewith while the vehicle is operating at high speed.

Another advantage of the vehicle wiper 10 according to the present embodiment is that a wide air-emitting passage 47 is provided between the first mounting portion 27 and the pair of second mounting portions 29, as seen from the top of the wiper blade 20. The passage 47 is permitted to emit air between the first lever 26 and the pair of second levers 32. To be specific, the pair of rear edge portions 42A of the fin portions 42 is forwardly offset from center line P which extends centrally through the first lever 25 and the pair of second levers 32. An airflow designated by arrow W4 of FIG. 4 thereby passes easily between the first lever 26 and the pair of second levers 32, which results in improved aerodynamic characteristics. As a result, while the vehicle travels at high speed, the wiper blade 20 is allowed to wipe the windshield 22 in contact therewith without being lifted from the windshield 22.

The present embodiment offers a further advantage in which the first lever 26 can acquire sufficient rigidity because the first lever 26 is formed with two pairs of twisted portions 44 and 45. One pair of twisted portions 44 integrally combines the pair of fin portions 42 with the first mounting portion 27. The other pair of twisted portions 45 combines the pair of fin portions 42 integrally with the pair of second mounting portions 29. The first mounting portion 27 has the front wall 27A and the rear wall 27B defined at both sides thereof in the longitudinal direction of the vehicle, so as to allow the first mounting portion 27 be mounted to the wiper arm 12. The pair of second mounting portions 29 has a substantially rectangular-shaped cross-section such as to permit the pair of second levers 32 to be mounted to the pair of second mounting portions 29.

A still further feature of the vehicle wiper 10 in accordance with the present embodiment is that the connecting fin portion 31 includes the horizontal portion 31A and the beveled portion 31B. The horizontal portion 31A extends in the forward direction of the vehicle continuously from the bottom edge portion of the front wall 27A. The beveled portion 31B extends in the lower-forward direction of the vehicle continuously from the horizontal portion 31A. As designated by arrows W1, W2, and W3 of FIG. 3, there are air currents which separately flow along the connecting fin portion 31. In particular, the air current W3, which flows along the underside of the connecting fin portion 31, is guided by the horizontal portion 31A into a path which extends through the underside of the rear wall 27B of the first mounting portion 27. This shift in airflow W3 reduces the occurrence of disturbed airflow which would otherwise be caused by the rear wall 27B of the first mounting portion 27. Such a smooth flow of air provides improved aerodynamic characteristics. The wiper blade 20 is thereby allowed to wipe against the windshield 22 without being lifted therefrom when the vehicle runs at high speed.

Figure 5A:
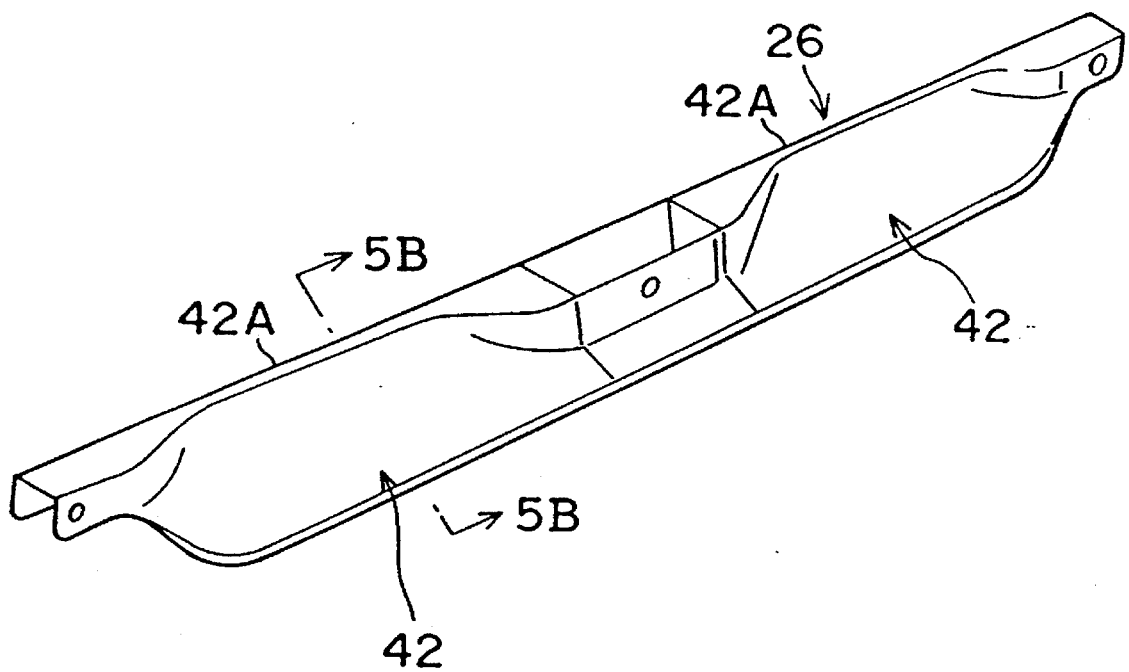
FIG. 5A is a perspective view, illustrating a first lever of a vehicle wiper in accordance with a variation of the first embodiment.
Figure 5B:
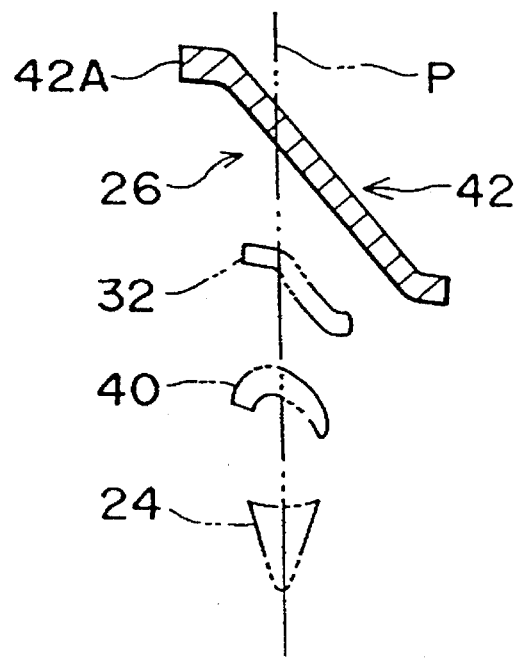
FIG. 5B is a cross-sectional view taken along line 5B—5B of FIG. 5A.

Note that the pair of rear edge portions 42A of the fin portions 42 may be offset rearward from center line P which extends through the first lever 26 and the second lever 32, as illustrated in FIGS. 5A and 5B, as opposed to the present embodiment shown in FIG. 2 in which the pair of rear edge portions 42A are located in front of the same center line P. Alternatively, the pair of rear edge portions 42A may be coextensive with the same center line P.

Figure 6A:
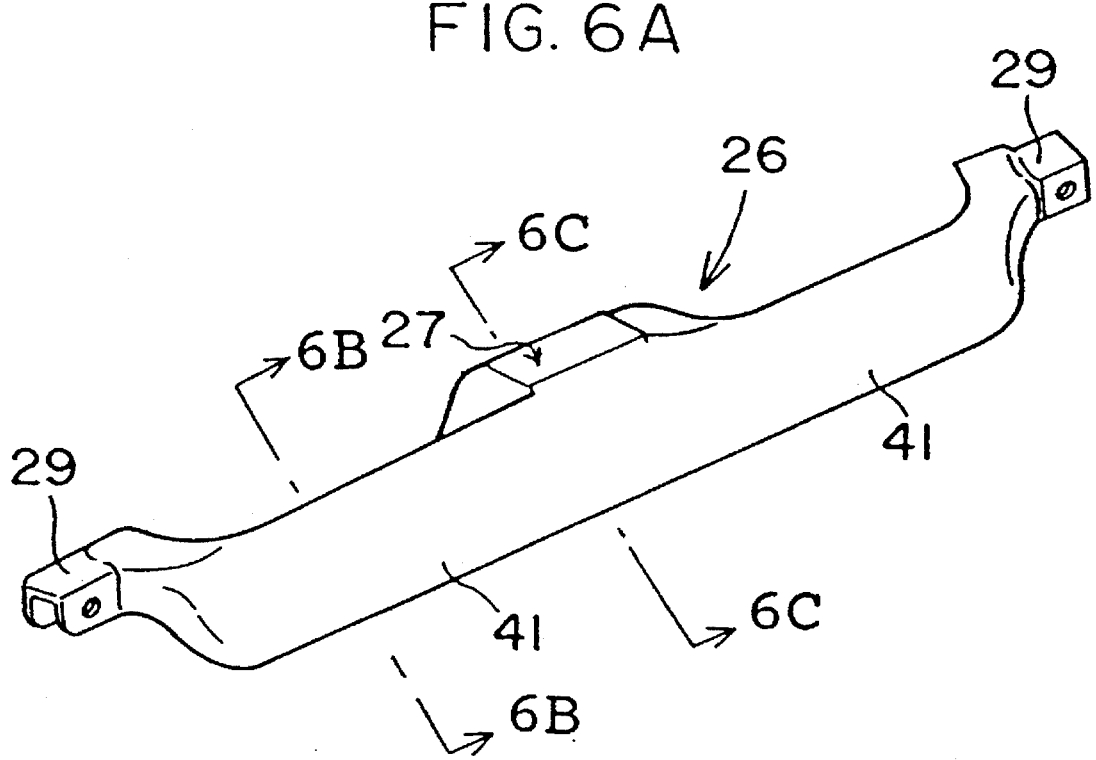
FIG. 6A is a perspective view, showing a first lever of a vehicle wiper according to a modification of the first embodiment.
Figure 6B:
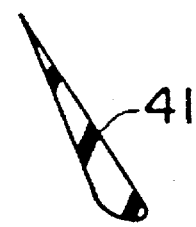
FIG. 6B is a cross-sectional view taken along line 6B—6B of FIG. 6A.
Figure 6C:
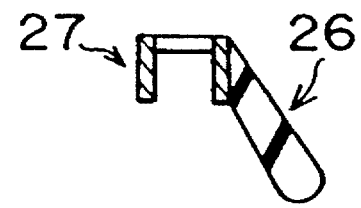
FIG. 6C is a cross-sectional view taken along line 6C—6C of FIG. 6A.
Figure 7:
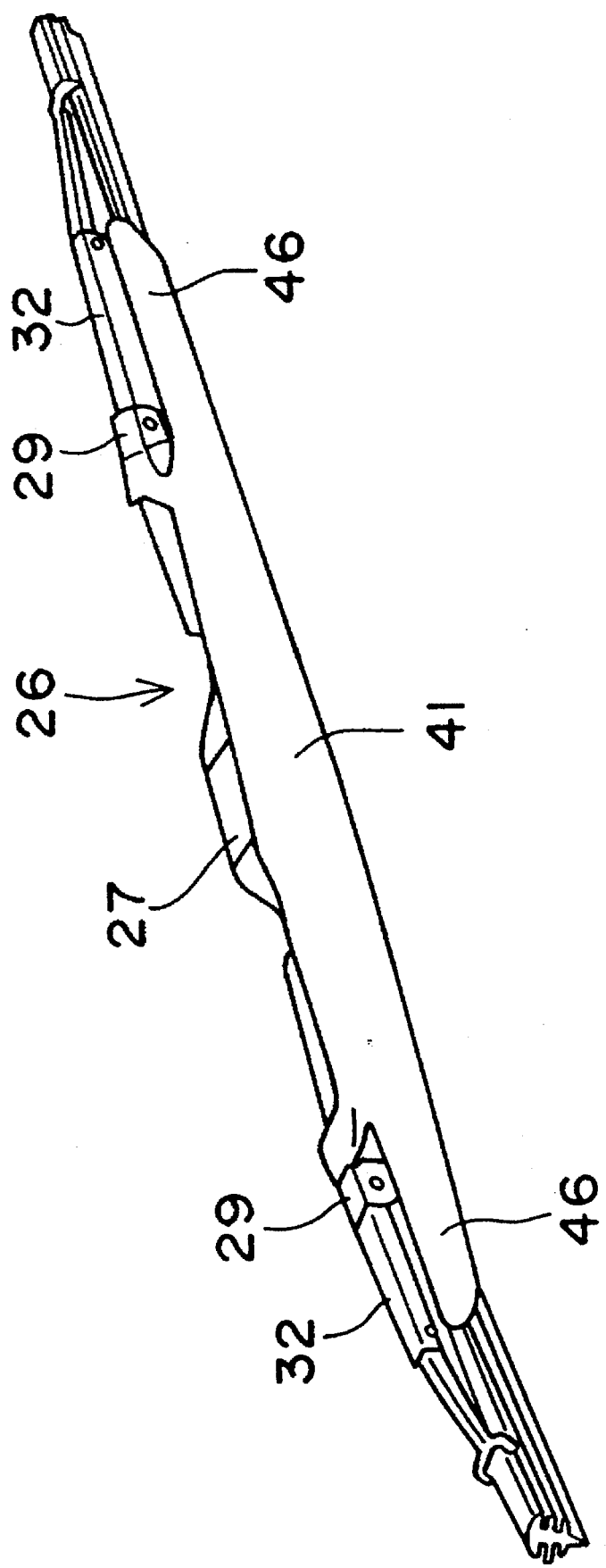
FIG. 7 is a perspective view, illustrating a first lever of a vehicle wiper according to another modification of the first embodiment.

Furthermore, as illustrated in FIGS. 6A, 6B, and 6C, metallic portions of the first lever 26 may be limited to the first and second mounting portions 27 and 29. The rest of the first lever 26 may be made of a resin material, instead of metal in accordance with the present embodiment. In this variation, however, continuous-connecting portions of the first lever 26 between the first mounting portion 27 and a pair of fin portions 41 are made thicker for reinforcement. Thus, the first and second mounting portions are formed of material having a higher rigidity than remaining portions of the first lever 26. In addition, as shown in FIG. 7, the pair of fin portions 41 may be formed with a pair of additional fin portions 46. The pair of additional fin portions 46 is made of a resin material, and is disposed in front of the pair of second levers 32 in the forward direction of the vehicle.

Figure 8:
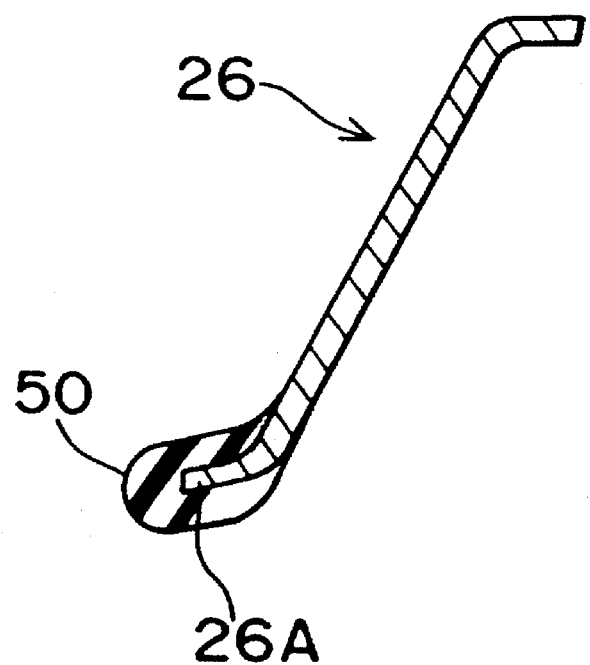
FIG. 8 is a cross-sectional view, illustrating a first lever of a vehicle wiper according to a further variation of the first embodiment.
Figure 9:
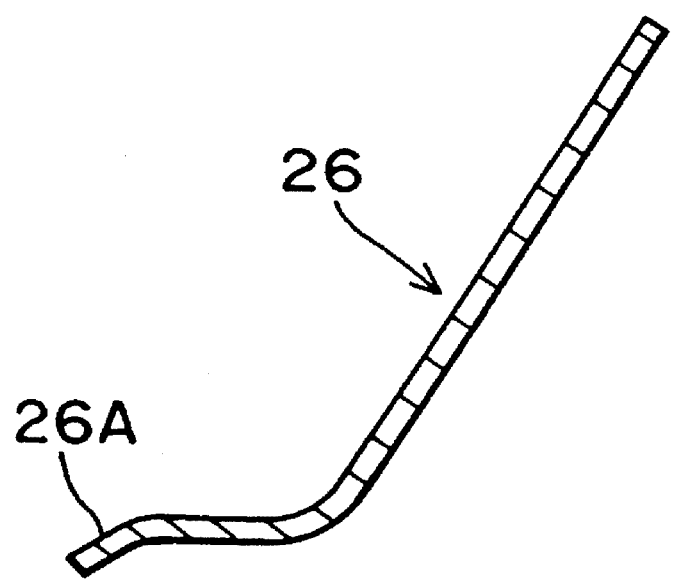
FIG. 9 is a cross-sectional view, showing a first lever of a vehicle wiper according to a still further variation of the first embodiment.

Furthermore, referring to FIG. 8, the leading edge portion 26A of the first lever 26 may be sheathed with a shock-absorbing material 50 in order to provide a smooth wipe of the windshield 22 if the fin portions 42 or 41 interfere with the windshield 22. Alternatively, the leading edge portion 26A may be bent in a direction shown in FIG. 9. These countermeasures provide increased safety against the fin portions 42 or 41 and the windshield 22.

Note that the cross-sectional shape of the first lever 26 is not limited to the details according to the embodiment and attendant variations as previously described, but may be applicable to others as shown in FIGS. 10A through 10G. Furthermore, the cross-sectional shapes of the second lever 32 and the yoke lever 40 are not limited to those according to the above-described embodiment and attendant variations, but may be formed into those shown in FIGS. 11A and 11B.

While the present invention has been shown and described with reference to the preferred embodiment and associated variations thereof, it is to be understood that numerous changes and modifications may be made without departing from the spirit or scope of the following claims.

What is claimed is:

1. A vehicle wiper for use with a vehicle windshield, comprising:

a first lever having opposing end portions and front and rear portions;

a plurality of second levers supporting an elongated rubber wiper blade, said first lever having said second levers pivotably connected to the end portions thereof while being pivotably held to a wiper arm at an intermediate portion of said first lever, said first lever including:

a first mounting portion having spaced, opposing sides and having a pair of side walls defined at the opposing sides so as to permit said first lever to be mounted to said wiper arm, said first mounting portion further comprising a connecting fin portion which extends continuously from a bottom edge portion of one wall of said pair of side walls of said first mounting portion;

a pair of second mounting portions, each including a pair of side walls spaced apart from each other, thereby assuming a substantially U-shaped cross-section such that each of said second levers is mounted to an associated second mounting portions;

a pair of fin portions, one fin portion being defined between said first mounting portion and one of said second mounting portion and another said fin portion being defined between said first mounting portion and another said second mounting portion, said fin portions extending from said first and second mounting portions in such a manner to extend beyond said one wall of said pair of side walls of said first mounting portion as well as one wall of said pair of side walls of an associated second mounting portion, said one walls of said pairs of side walls of said first and second mounting portions being located at the front portion of the first lever, said fin portions having a rear edge portion formed at a top portion thereof, said rear edge portion of each said fin portion being offset with respect to a longitudinal axis of said second levers, thereby preventing a wiper blade from being lifted from the windshield so as to wipe against the windshield when the vehicle travels at high speed; and, twisted portions integrally combining said fin portions with said first mounting portion as well as an associated second mounting portion in such a manner that each said fin portion is joined smoothly and continuously and is integral with a front wall of said first mounting portion and a front wall of an associated second mounting portion, whereby said fin portions, said twisted portions, the front wall of the first mounting portion, and the front wall of the associated second mounting portion are formed smooth and continuous, so that air may flow smoothly over the vehicle wiper and windshield, wherein said first mounting portion and each said second mounting portions are formed of metal, with remaining portions thereof being made of resin materials.

2. A vehicle wiper according to claim 1, wherein said connecting fin portion and said fin portion have edge portions, said edge portions being integrally combined into a leading edge portion which is bent in such a manner so as to prevent airflow burble when the vehicle wiper is mounted with respect to the windshield.

3. A vehicle wiper according to claim 2, wherein said leading edge portion is sheathed with a shock-absorbing material.

4. A vehicle wiper according to claim 2, wherein said leading edge portion is curved.

5. A vehicle wiper according to claim 1, wherein each said fin portion is formed of a resin material, and comprises an additional fin portion which extends in a longitudinal direction of said wiper blade from an end portion thereof located in the longitudinal direction of said wiper blade.

6. A vehicle wiper according to claim 1, wherein said fin portion slants at an angle in the range of zero to 90 degrees with respect to a surface of said windshield.

* * * * *